United States Patent
Takeda et al.

(10) Patent No.: US 9,068,740 B2
(45) Date of Patent: Jun. 30, 2015

(54) SUNLIGHT HEAT UTILIZED STEAM ABSORPTION CHILLER AND SUNLIGHT HEAT UTILIZATION SYSTEM

(75) Inventors: Nobuyuki Takeda, Tsuchiura (JP); Shuichiro Uchida, Tsuchiura (JP); Jun Yoshida, Yamaguchi (JP); Shinichirou Kawane, Kudamatsu (JP)

(73) Assignee: HITACHI, LTD., Tokyo (JP)

( * ) Notice: Subject to any disclaimer, the term of this patent is extended or adjusted under 35 U.S.C. 154(b) by 499 days.

(21) Appl. No.: 13/469,112

(22) Filed: May 11, 2012

(65) Prior Publication Data
US 2012/0285189 A1 Nov. 15, 2012

(30) Foreign Application Priority Data
May 13, 2011 (JP) ................... 2011-108402

(51) Int. Cl.
*F25B 27/00* (2006.01)
*F22B 1/00* (2006.01)
*F01K 3/24* (2006.01)
*F01K 21/00* (2006.01)
*F01K 25/06* (2006.01)
*F25B 15/02* (2006.01)
(Continued)

(52) U.S. Cl.
CPC ... *F22B 1/00* (2013.01); *F01K 3/24* (2013.01); *F01K 21/00* (2013.01); *F01K 25/065* (2013.01); *F25B 15/02* (2013.01); *F25B 27/00* (2013.01); *F25B 41/04* (2013.01); *F25B 49/04* (2013.01); *F24J 2/07* (2013.01)

(58) Field of Classification Search
CPC ...... F25B 27/007; F25B 29/006; F25B 35/00; F25B 27/02; Y02B 10/20; Y02E 10/44; Y02E 10/40
USPC .............. 62/79, 230, 238.1, 238.3, 271
See application file for complete search history.

(56) References Cited

U.S. PATENT DOCUMENTS 4,222,244 A * 9/1980 Meckler ............... 62/235.1
5,479,783 A * 1/1996 Uchida ................. 62/101
(Continued)

FOREIGN PATENT DOCUMENTS

JP 57-108564 7/1982
JP 2001-82823 3/2001
(Continued)

OTHER PUBLICATIONS

JP Office Action of Appln. No. 2011-108402 dated Apr. 30, 2014 with partial English translation.

*Primary Examiner* — Melvin Jones
(74) *Attorney, Agent, or Firm* — Oliff PLC

(57) ABSTRACT

A sunlight heat utilized steam absorption chiller is provided with a generator which uses steam generated by sunlight heat as a heat source, an absorber, an evaporator, and a condenser, and has a heat exchanger for allowing heat exchange between a dilute solution flowing from the absorber to the generator and a strong solution flowing from the generator to the absorber. The chiller is provided with a burning heat source for generating steam, and either the steam generated by the burning heat source or the steam generated using sunlight heat can be used as the heat source for the generator. The chiller is provided with a steam drain heat recovery unit for allowing heat exchange between at least part of the dilute solution flowing from the absorber to the generator and a steam drain discharged from the generator so as to allow heat recovery from the steam drain.

11 Claims, 7 Drawing Sheets

(51) Int. Cl.
*F25B 41/04* (2006.01)
*F25B 49/04* (2006.01)
*F24J 2/07* (2006.01)

(56) References Cited

U.S. PATENT DOCUMENTS 5,819,546 A * 10/1998 Uchida ............................ 62/141
6,453,693 B1 * 9/2002 Ewert et al. ..................... 62/236
6,993,933 B2 2/2006 Nishimoto

FOREIGN PATENT DOCUMENTS

| | | |
|---|---|---|
| JP | 2002-071239 | 8/2002 |
| JP | 2004-324977 | 11/2004 |
| JP | 2005-300047 | 10/2005 |
| JP | 2008-121999 | 5/2008 |
| JP | 2010-190460 | 9/2010 |

* cited by examiner

NIGHT TIME OPERATION MODE

DAY TIME OPERATION MODE

SUNLIGHT HEAT UTILIZED STEAM ABSORPTION CHILLER AND SUNLIGHT HEAT UTILIZATION SYSTEM

BACKGROUND OF THE INVENTION

1. Field of the Invention

The present invention relates to sunlight heat utilized steam absorption chillers and sunlight heat utilization systems which use sunlight heat to generate steam and have a generator using the steam as a heat source; the present invention is suitable for single-effect, double-effect, or triple-effect absorption chillers, in particular, for a triple-effect steam absorption chiller.

2. Description of the Related Art

Absorption chillers have been widely spread as an apparatus for obtaining cold using a variety of heat sources, and systems combining this absorption chiller with a solar thermal collector also have been put into practical use.

A conventional technology of such, for example, is stated in Japanese Patent Laid-open No. 2010-190460 (patent document 1). The patent document 1 states a technology in which sunlight heat is used to generate steam, the steam is used as a heat source for operating an absorption chiller, and cold from the absorption chiller is supplied to air-conditioning equipment to condition air.

In addition, Japanese Patent Laid-open No. 2001-82823 (patent document 2) also states a system combining an absorption chiller and a solar thermal collector, in which system in the patent document 2, a dilute solution diluted in an absorber is heated by sunlight heat and concentrated in a flashing generator when the weather is clear, but in rainy weather, the dilute solution diluted in the absorber is sent to a high-temperature generator, where it is heated by a burning heat source such as a burner to be concentrated by evaporating water.

CITATION LIST

Patent Literature

{Patent document 1} Japanese Patent Laid-open No. 2010-190460
{Patent document 2} Japanese Patent Laid-open No. 2001-082823

SUMMARY OF THE INVENTION

Technical Problem

The patent document 1 discloses a technology which uses sunlight heat to operate the absorption chiller, but no consideration is given with regard to operating the absorption chiller at night or in rainy weather.

The patent document 2 describes a system which uses a burning heat source such as a burner to operate the absorption chiller in rainy weather which does not allow the use of sunlight heat; however, in order to allow the use of both sunlight heat and the burning heat source such as a burner, a high-temperature generator and a flashing generator are both required, unfavorably increasing the cost.

The patent document 2 discloses that the dilute solution diluted in the absorber can be concentrated by using either the sunlight heat or the burning heat source such as a burner; however, no consideration is given with regard to efficient operation when both of the sunlight heat and the burning heat source are used.

It is an object of the present invention to obtain a sunlight heat utilized steam absorption chiller and a sunlight heat utilization system which allow a dilute solution diluted in an absorber to be concentrated by either sunlight heat or a burning heat source without providing a flashing generator, and at the same time, achieve efficient operation.

Solution to Problem

In order to achieve the above object, the present invention provides a sunlight heat utilized steam absorption chiller including a generator which uses steam generated by sunlight heat as a heat source, an absorber, an evaporator, and a condenser; and having a heat exchanger for allowing heat exchange between a dilute solution flowing from the absorber to the generator and a strong solution flowing from the generator to the absorber; characterized by having a means for generating steam by a burning heat source, and either the steam generated by the burning heat source or the steam generated by utilizing sunlight heat can be inputted as a heat source for the generator.

Preferably, a steam drain heat recovery unit is provided for allowing heat exchange between at least part of the dilute solution flowing from the absorber to the generator and a steam drain discharged from the generator, so that heat can be recovered from the steam drain.

The other aspect of the present invention is a sunlight heat utilization system provided with a steam generator including a solar thermal collector for generating a high-temperature heating medium by sunlight heat and a steam generating means for generating steam from the high-temperature heating medium generated by the solar thermal collector, wherein the high-temperature steam generated by the steam generator is introduced to the sunlight heat utilized steam absorption chiller.

The solar thermal collector preferably has a solar thermal collecting portion, a sunlight heat receiving portion for receiving the sunlight collected by the solar thermal collecting portion to heat the heating medium flowing inside, and a heat insulating portion for insulating heat around the sunlight heat receiving portion but allowing the sunlight to pass.

Advantageous Effects of Invention

According to the present invention, the sunlight heat utilized steam absorption chiller and the sunlight heat utilization system can be obtained which allow a dilute solution diluted in an absorber to be concentrated by either sunlight heat or a burning heat source without providing a flashing generator, and furthermore, achieve efficient operation. In addition, since the efficiency of the chiller is improved by the present invention, not only the amount of steam for operating the chiller can be reduced but also a heat collecting area of an expensive solar thermal collector for generating steam from sunlight heat, which is renewable energy, can be reduced so that the equipment cost and the operation cost can be minimized for the entire sunlight heat utilization system integrating the absorption chiller portion with the steam generating portion including the solar thermal collector.

DESCRIPTION OF THE PREFERRED EMBODIMENTS

Figure 1:
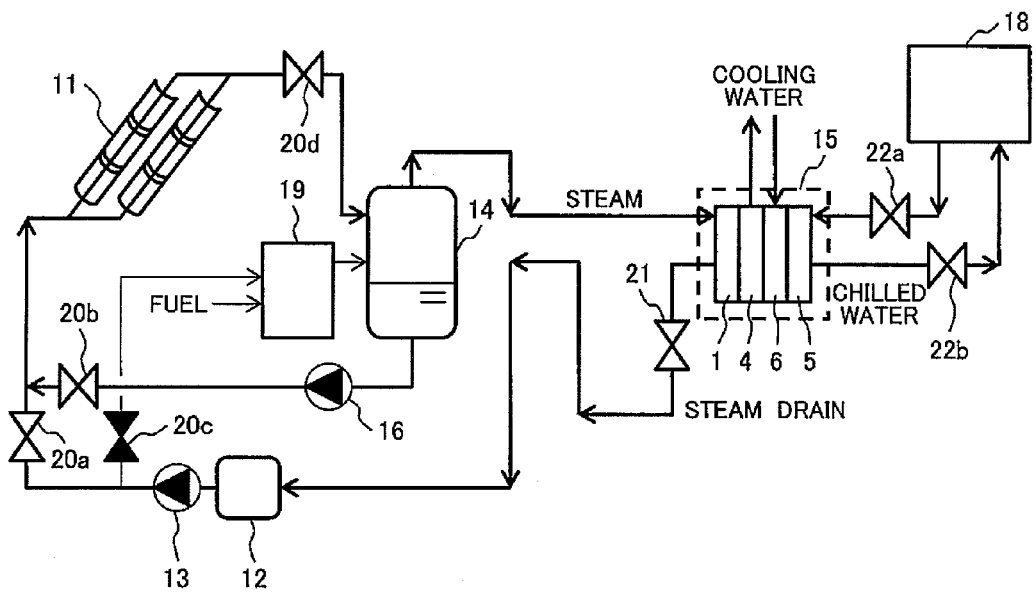
FIG. 1 is a system diagram showing an example of a sunlight heat utilization system according to the present invention, illustrating a day time operation mode.

Specific embodiments of the sunlight heat utilized steam absorption chiller and the sunlight heat utilization system according to the present invention will be described below with reference to the accompanying drawings. In each drawing, components having the same reference numerals are the same or corresponding components.

Example 1

An example of the sunlight heat utilization system according to the present invention will be described with reference to FIGS. 1 and 2. In FIG. 1, 11 is a solar thermal collector for collecting sunlight heat. The solar thermal collector 11 is made up of a solar thermal collecting portion for collecting sunlight toward a heat collecting pipe by, for example, a trough-shaped reflecting mirror having a parabolic cross-section as a light collecting mechanism, a sunlight heat receiving portion for transferring the energy to a heating medium flowing inside the heat collecting pipe, and a clear heat insulating pipe (a heat insulating portion) for forming a heat insulating space around the outer circumference of the heat collecting pipe. The solar thermal collector 11 is introduced with the heating medium such as water or warm water from a warm water tank 12 by a circulation pump 13, and in the solar thermal collector 11, high-temperature water at 220 to 250° C., for example, (a pressure of 2 MPa or more, e.g.) or a mixed fluid of high-temperature water and high-temperature steam is generated by sunlight heat, which high-temperature water (the heating medium) or the mixed fluid of high-temperature water and high-temperature steam is sent to a steam generating means (a separator) 14. The high-temperature water or the mixed fluid of high-temperature water and high-temperature steam flowed into the steam generating means 14 is slightly depressurized to approximately 1.9 MPa, e.g., to be separated into steam of 212° C., e.g., and warm water; this steam is supplied to an absorption chiller 15 to be used as an operation heat source. On the other hand, warm water accumulated in the lower portion of the steam generating means 14 is sent to the solar thermal collector 11 by a circulation pump 16 to be heated by sunlight heat again.

The steam used for concentrating a dilute solution in the absorption chiller 15 becomes a steam drain of 195° C., e.g., and sent to the warm water tank 12 or in some cases, sent directly to the solar thermal collector 11.

The absorption chiller 15 is connected to an air-conditioner 18 with chilled water pipes; water flows from the air-conditioner 18 at 15° C., e.g., which is chilled to about 7° C. in an evaporator 5 of the absorption chiller 15, then the chilled water is supplied back to the air-conditioner 18 to cool a room, etc.

In addition, the absorption chiller 15 is supplied with cooling water of 34° C., e.g., from a cooling tower or the like; the cooling water exchanges heat in an absorber 6 or a condenser 4 constituting the absorption chiller 15, is heated to 39° C., e.g., and returns to the cooling tower. Note that 1 is a generator.

19 is a boiler for generating high-temperature water or high-temperature steam, provided as a backup for when high-temperature water cannot be generated by sunlight heat in the solar thermal collector 11 due to night time or bad weather such as rain. This boiler generates high-temperature steam using a burning heat source such as a burner, and supplies the steam to the steam generating means 14.

Note that 20a to 20d, 21, 22a, and 22b are opening/closing valves provided to each pipe.

The sunlight heat utilization system in FIG. 1 shows a day time operation mode where sunlight heat is available; in the example of FIG. 1, the opening/closing valves 20a, 20b, and 20d provided to warm water pipes are open and the opening/closing valve 20c is closed to stop warm water from flowing into the boiler 19, and the boiler is being shut down.

The opening/closing valve 21 provided to the exit side of the steam drain from the absorption chiller 15 is opened when the absorption chiller 15 is in operation or closed when it is stopped. Furthermore, the opening/closing valves 22a and 22b provided to the chilled water pipes connecting the absorption chiller 15 and the air-conditioner 18 are opened when the air-conditioner is in use or closed when it is stopped.

The operation mode of the sunlight heat utilization system when high-temperature water cannot be generated by sunlight heat such as night time (hereinafter, referred to as a night time operation mode) will be described with reference to FIG. 2.

Figure 2:
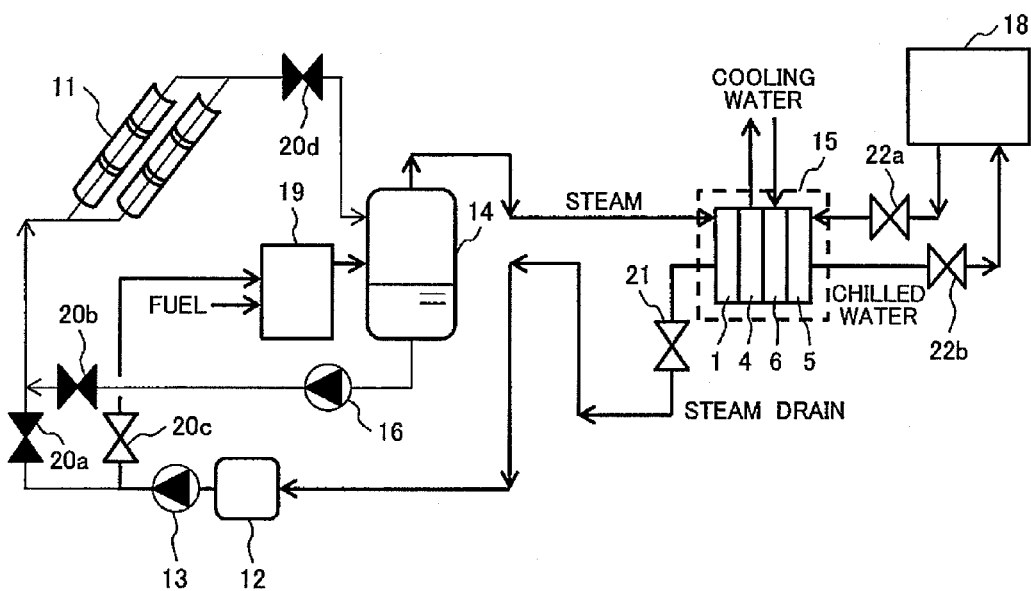
FIG. 2 is a system diagram of the sunlight heat utilization system shown in FIG. 1, illustrating a night time operation mode.

In the night time operation mode, as shown in FIG. 2, the opening/closing valves 20a, 20b, and 20d provided to the warm water pipes for sending warm water to the solar thermal collector 11 are controlled to be closed, and the opening/closing valve 20c provided to the warm water pipe for sending warm water to the boiler 19 is controlled to be open. Furthermore, fuel is put into the boiler 19 to start the boiler, and warm water supplied to the boiler 19 from the warm water tank 12 by the circulation pump 13 is heated to generate high-temperature steam of 1.9 MPa, e.g. This steam is passed through the steam generating means 14 and supplied to the absorption chiller 15 to be the operation heat source. The steam used for concentrating a dilute solution in the absorption chiller 15 turns into a steam drain and returns to the warm water tank 12.

The examples shown in FIGS. 1 and 2 have a configuration in which the high-temperature water or the mixed fluid of high-temperature water and high-temperature steam, that is, the high-temperature heating medium is generated in the solar thermal collector 11, which is separated into steam and warm water in the steam generating means (separator) 14, and the steam is supplied to the absorption chiller 15; however, the present invention is not limited to such configuration. For example, a heat-transfer pipe may be disposed in the steam generating means 14 and a high-temperature heating medium (water or a fluid other than water) generated in the solar thermal collector 11 may be passed into the heat-transfer pipe while a steam drain (warm water) used in the absorption chiller 15 is introduced to the steam generating means 14 to allow exchanging heat with the high-temperature heating medium flowing in the heat-transfer pipe; then the steam drain inside the steam generating means 14 heated by the high-temperature heating medium flowing in the heat-transfer pipe would generate high-temperature steam which can be supplied to the absorption chiller 15. Such configuration may also be adopted.

Figure 3:
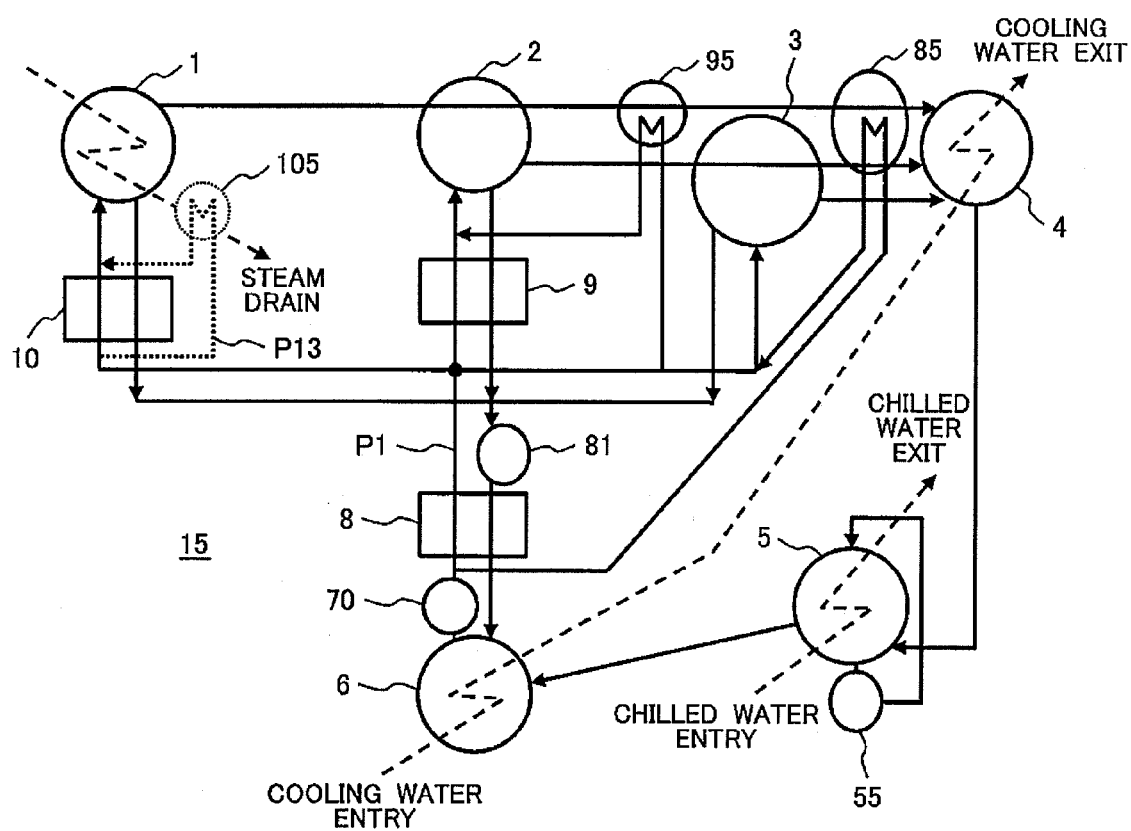
FIG. 3 is a system diagram showing Embodiment 1 of a sunlight heat utilized steam absorption chiller according to the present invention.
Figure 4:
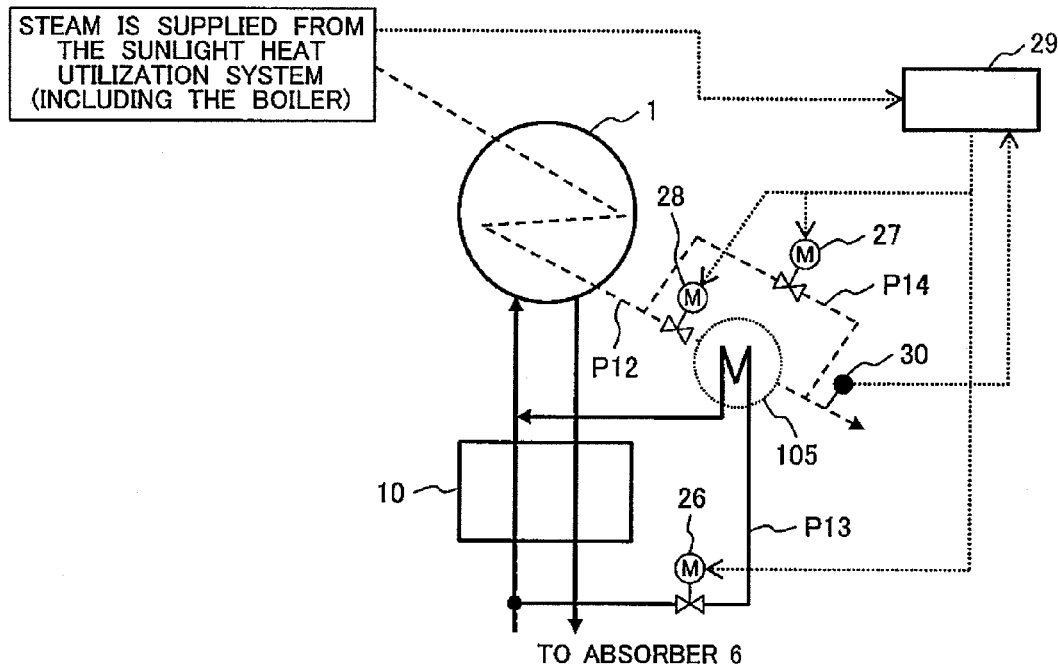
FIG. 4 is a system diagram of an important part, illustrating the details of the structure around a high-temperature generator shown in FIG. 3.

Next, a configuration of the absorption chiller 15 shown in FIGS. 1 and 2 will be explained with reference to FIGS. 3 and 4. FIG. 3 is a system diagram showing Embodiment 1 of the sunlight heat utilized steam absorption chiller according to the present invention, and FIG. 4 is a system diagram of an important part, illustrating the details of the structure around a high-temperature generator shown in FIG. 3.

The absorption chiller 15 of the present embodiment shown in FIG. 3 has a high-temperature generator 1, a middle-temperature generator 2, and a low-temperature generator 3; it is a steam fired triple-effect absorption chiller in which, as described above, steam having a pressure of 1.9 MPa and a temperature of 212° C., e.g., is inputted to the high-temperature generator 1. A dilute solution from the absorber 6 is supplied in parallel to each of the high-temperature generator 1, the middle-temperature generator 2, and the low-temperature generator 3 by a dilute solution pump (a solution circulation pump) 70; this is called a parallel flow cycle. Solutions (strong solutions) concentrated in the high-temperature generator 1, the middle-temperature generator 2, and the low-temperature generator 3 are returned to the absorber 6 by a strong solution pump (a solution dispersing pump) 81 to be dispersed.

The high-temperature generator 1 separates refrigerant vapor from the dilute solution and then the refrigerant vapor is sent to the middle-temperature generator 2, and after heating the dilute solution inside the middle-temperature generator 2, it passes through a middle-temperature drain heat exchanger 95 followed by a low-temperature drain heat exchanger 85 to heat part of the dilute solution to be supplied to the middle-temperature generator 2 and part of the dilute solution to be supplied to the low-temperature generator 3 respectively; and then, it is sent to the condenser 4 to be condensed by cooling water.

The refrigerant vapor separated from the dilute solution in the middle-temperature generator 2 is sent to the low-temperature generator 3, and after heating the dilute solution inside the low-temperature generator 3, it passes through the low-temperature drain heat exchanger 85 to heat part of the dilute solution to be supplied to the low-temperature generator 3; and then, it is sent to the condenser 4 to be condensed by cooling water.

Note that 8 is a low-temperature heat exchanger for allowing heat exchange between the dilute solution outputted from the absorber 6 and the strong solution to be supplied to the absorber 6, 9 is a middle-temperature heat exchanger for allowing heat exchange between the dilute solution heated in the low-temperature heat exchanger 8 and the strong solution from the middle-temperature generator 2, and 10 is a high-temperature heat exchanger for allowing heat exchange between the dilute solution heated in the low-temperature heat exchanger 8 and the strong solution from the high-temperature generator 1.

Liquid refrigerant condensed in the condenser 4 is sent to the evaporator 5, is dispersed by a refrigerant pump 55, and evaporates by taking heat from chilled water flowing inside the evaporator 5, then flows into the absorber 6 to be absorbed by a solution. The chilled water flowing in the evaporator 5 flows into the evaporator 5 at 15° C., e.g., cooled to 7° C., and then, supplied to the air-conditioner 18 (see FIG. 1), etc.

The absorber 6 is supplied with cooling water of 34° C., in this example, from a cooling tower or the like to cool the absorber, then the cooling water flows into the condenser 4 to cool the refrigerant vapor while the cooling water itself is heated to about 39° C., and returns to the cooling tower.

As described above, the steam at 1.9 MPa and 212° C. is inputted to the high-temperature generator 1, and after the solution inside the high-temperature generator 1 is concentrated by this heat, the steam flows out of the high-temperature generator 1 as a steam drain. However, since the steam drain has a high temperature of nearly 200° C., a steam drain heat recovery unit 105 is additionally provided in the present embodiment so that the dilute solution can be introduced from the upstream side of the high-temperature heat exchanger 10 through a bypass pipe P13, and after the dilute solution is heated in the steam drain heat recovery unit 105 for heat recovery, the dilute solution can be introduced to the high-temperature generator 1. As a result, heat can be recovered until the temperature of the steam drain flows out of the steam drain heat recovery unit 105 reaches 90° C. or below.

The effect of the heat recovery by the steam drain heat recovery unit 105 is particularly great in the night time operation mode shown in FIG. 2. In the night time operation mode, fuel is supplied and burned to generate steam in the boiler 19, so the heat efficiency of the boiler will be significantly improved when the warm water cooled to 90° C. or below in the steam drain heat recovery unit 105 is heated in the boiler rather than when warm water of nearly 200° C. is heated in the boiler. Furthermore, heat can be recovered sufficiently in the steam drain heat recovery unit 105 so that the efficiency of the entire system can be improved.

In the day time operation mode shown in FIG. 1, however, no fuel is consumed since the high-temperature water is generated by sunlight heat. Because of this, the benefit of recovering heat in the steam drain heat recovery unit 105 is small. Moreover, when the absorption chiller 15 alone is taken into consideration, the efficiency of the absorption chiller 15 will be improved more when the entire dilute solution to be supplied to the high-temperature generator 1 is heated in the high-temperature heat exchanger 10 by the high-temperature strong solution from the high-temperature generator 1 since the temperature of the strong solution is reduced more in this way.

Figure 9:
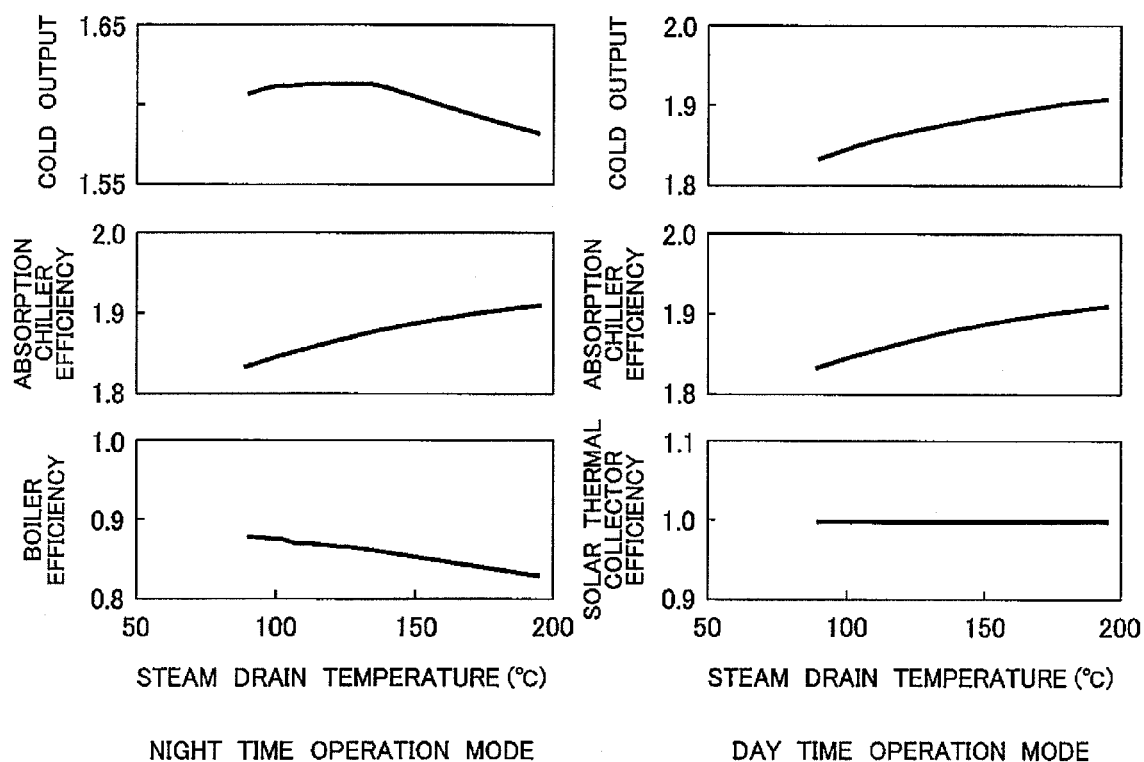
FIG. 9 includes line graphs showing the indices of boiler efficiency, absorption chiller efficiency, and solar thermal collector efficiency to the temperatures of a steam drain flowing out of a steam drain heat recovery unit in night time and day time operation modes with additional cold output at that time.

FIG. 9 includes line graphs showing the indices of boiler efficiency, absorption chiller efficiency, and solar thermal collector efficiency to the temperatures of the steam drain flowing out of the steam drain heat recovery unit 105 in the night time and the day time operation modes with additional cold output at that time. The figure shows that, in the night time operation mode, the maximum cold output is obtained when the temperature of the steam drain is around 120° C., while in the day time operation mode, the maximum cold output is obtained when the temperature of the steam drain is around 200° C.

Thus, in the present embodiment, as shown in FIG. 4, a solenoid valve or a flow-rate adjustable motor valve 26 is provided to the bypass pipe P13 for the dilute solution flowing into the steam drain heat recovery unit 105 bypassing the high-temperature heat exchanger 10, at the inlet side of the steam drain heat recovery unit. In addition, a bypass pipe P14 for bypassing the steam drain heat recovery unit 105 is provided to a pipe P12 for passing a steam drain to which the steam drain heat recovery unit 105 is provided, and a solenoid valve or a flow-rate adjustable motor valve 27 is provided to the bypass pipe P14. Furthermore, a solenoid valve or a flow-rate adjustable motor valve 28 is provided between the steam drain heat recovery unit 105 and a branching portion of the pipe P12 branching off to the bypass pipe P14.

These valves (solenoid valves or motor valves) 26 to 28 are controlled by a controller 29 to open/close or to adjust an opening rate. In addition, a temperature detector 30 for detecting the temperature of the steam drain flowing in the pipe P12 is provided to the pipe P12 in the downstream side of the steam drain heat recovery unit 105 where the bypass pipe P14 rejoins.

The controller 29 is inputted with temperature information from the temperature detector 30 and operation information from the sunlight heat utilization system (including the boiler) shown in FIG. 1, and the controller 29 controls the valves 26 to 28, for example, as follows.

In the day time operation mode when steam is generated using sunlight heat, shown in FIG. 1, the controller 29 closes the valves 26 and 28 and opens the valve 27. Consequently, the steam drain outputted from the high-temperature generator 1 is returned to the warm water tank 12 at 195° C., e.g., and the warm water in the warm water tank 12 is supplied to the solar thermal collector 11 by the circulation pump 13 and heated by sunlight heat to be high-temperature water of 220 to 250° C., e.g. In this way, the cycle of supplying steam at 212° C., e.g., to the high-temperature generator 1 of the absorption chiller 15 is repeated.

In the night time operation mode shown in FIG. 2, no sunlight heat is used but a burning heat source is used to generate steam in the boiler, in which case the controller 29 controls to improve the boiler efficiency. In other words, when the valves 26 to 28 are solenoid valves (opening/closing valves), the valves 26 and 28 are opened while the valve 27 is closed. This allows the steam drain heat recovery unit 105 to recover heat from the high-temperature steam drain and increase the temperature of the dilute solution to be supplied to the high-temperature generator 1. Moreover, the temperature of the steam drain can be reduced to 90° C. or below, e.g., by the heat recovery, which low-temperature warm water is supplied to the boiler 19 so that the boiler efficiency can be improved.

When the valves 26 to 28 are flow-rate adjustable motor valves, they can be controlled to improve the combined efficiency of the boiler efficiency and the absorption chiller efficiency. In other words, although the greater the heat recovery in the steam drain heat recovery unit 105, the greater the improvement in the boiler efficiency, the greater heat recovery will decrease the heat exchange amount in the high-temperature heat exchanger 10, causing the strong solution from the high-temperature generator 1 not to be cooled enough in the high-temperature heat exchanger 10 so that the efficiency of the absorption chiller 15 will be reduced.

Thus, a relationship between the combined total efficiency of the boiler efficiency and the absorption chiller efficiency and the temperatures detected by the temperature detector 30 can be obtained by experiments or analysis in advance, and the valves 26 to 28 can be controlled by the controller 29 so as to make the temperature detected by the temperature detector 30 stay in a predetermined temperature range which improves the total efficiency combining the boiler efficiency (the burning heat source efficiency) and the absorption chiller efficiency. This configuration allows the combined efficiency of the boiler efficiency and the absorption chiller efficiency to be improved.

Figure 5:
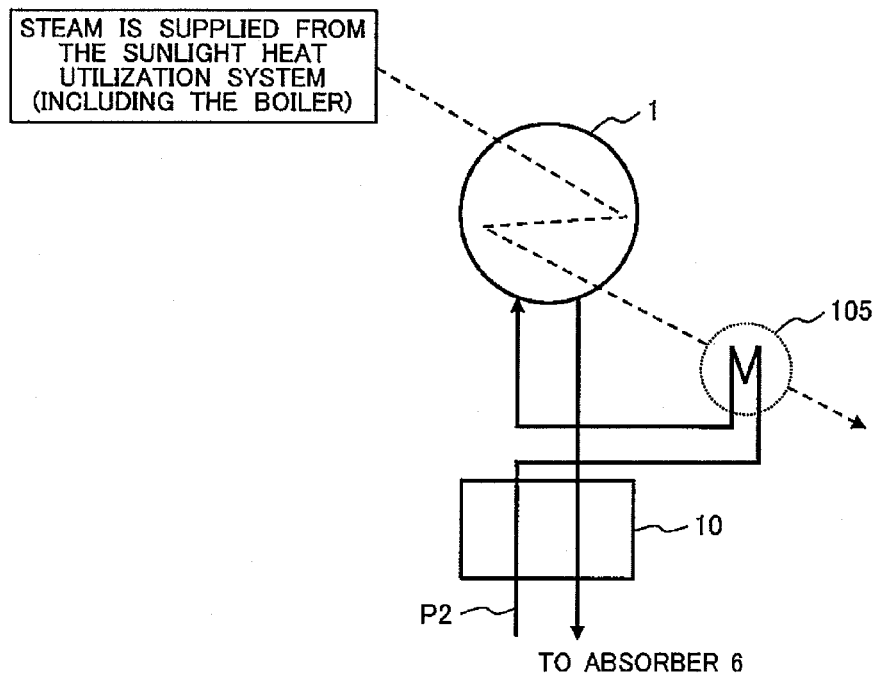
FIG. 5 corresponds to FIG. 4, which is a system diagram of the important part of FIG. 3, illustrating a different example from FIG. 4.

FIG. 5 corresponds to FIG. 4, which is a system diagram of an important part illustrating the details of the structure around the high-temperature generator 1 shown in FIG. 3, showing a different example from FIG. 4. In this example, no bypass pipe P13 shown in FIG. 4 is provided, but a pipe P2 is made to allow the dilute solution after passing the high-temperature heat exchanger 10 to flow through the steam drain heat recovery unit 105 before flowing into the high-temperature generator 1 to recover heat from the steam drain.

This example shown in FIG. 5 allows the dilute solution for the high-temperature generator 1 to exchange heat in the high-temperature heat exchanger 10 with the strong solution from the high-temperature generator 1, and then, to recover heat from the steam drain also in the steam drain heat recovery unit 105. Thus, heat can be recovered from both of the strong solution from the high-temperature generator 1 and the steam drain, so that heat recovery from the steam drain can be achieved without reducing the efficiency of the absorption chiller. Furthermore, in this example, the valves 26 to 28 and the controller 29 are not needed, and the efficiency can be improved with a simple configuration particularly in the night time operation mode shown in FIG. 2.

Next, a preferred illustrative embodiment of the sunlight heat utilized steam absorption chiller will be described with reference to FIG. 6. The triple-effect absorption chiller according to the present embodiment shown in FIG. 6 has the high-temperature generator 1, the middle-temperature generator 2, the low-temperature generator 3, the condenser 4, the evaporator 5, the refrigerant pump 55, the absorber 6, the dilute solution pump 70, the strong solution pump 81, the low-temperature heat exchanger 8, the middle-temperature heat exchanger 9, the high-temperature heat exchanger 10, the low-temperature drain heat exchanger 85, the middle-temperature drain heat exchanger 95, the steam drain heat recovery unit 105, and solution pipes and refrigerant pipes connecting these devices. In the present embodiment, water is used as a refrigerant for the chiller and lithium bromide as an absorbent.

Next, the details of the structure of this chiller will be explained along with its behaviors during operation.

Chilled water used for air-conditioning is cooled by the evaporation heat of a refrigerant in the evaporator 5 and sent to a load system for an air-conditioner through a pipe 59. Refrigerant vapor generated in the evaporator 5 is absorbed by a solution in the absorber 6. This absorption maintains the pressure inside the evaporator low and the evaporation temperature low. In the present embodiment, the evaporator 5 and the absorber 6 have a two-stage evaporation absorption structure. That is, the refrigerant vapor evaporated in an upper-stage evaporating portion 5a is absorbed in an upper-stage absorbing portion 6a, and the refrigerant vapor evaporated in a lower-stage evaporating portion 5b is absorbed in a lower-stage absorbing portion 6b. This structure further improves the operation efficiency of the chiller.

In the absorber 6, the solution heated and concentrated in each of the high-temperature generator 1, the middle-temperature generator 2, and the low-temperature generator 3, that is, the strong solution is supplied through a pipe P3 to be dropped on a heat-transfer tube bundle 63. The strong solution dropped is cooled by the cooling water flowing inside the heat-transfer tube bundle 63 in the absorber 6, and at the same time, absorbs refrigerant vapor and becomes a solution having a lower concentration, that is, a dilute solution, then accumulated in the lower portion of the absorber 6.

This dilute solution is sent by the dilute solution pump 70, and separated through the pipes P2 to the low-temperature heat exchanger 8 and the low-temperature drain heat exchanger 85.

The dilute solution sent to the low-temperature heat exchanger 8 exchanges heat with the strong solution to be passed into the absorber 6 and increases its temperature. On the other hand, the dilute solution sent to the low-temperature drain heat exchanger 85 exchanges heat with a refrigerant drain condensed in the low-temperature generator 3 and a refrigerant drain from the middle-temperature generator 2 which has passed the middle-temperature drain heat exchanger 95, and increases its temperature. Then, these dilute solutions are rejoined once, then separated again as one part is sent to the low-temperature generator 3 through a pipe P6, another part is sent to the middle-temperature heat exchanger 9, and the remaining is sent to the middle-temperature drain heat exchanger 95. The refrigerant drain whose temperature is reduced by exchanging heat with the dilute solution in the low-temperature drain heat exchanger 85 is introduced to the condenser 4 through a pipe P7.

Refrigerant vapor generated in the middle-temperature generator 2 is sent to the inside of tubes of a heat-transfer tube bundle 33 via a pipe P4. The dilute solution sent to the low-temperature generator 3 is heated and concentrated by the heat-transfer tube bundle 33 and becomes a solution having a high concentration, that is, a strong solution. This strong solution through a pipe P8 is joined together with strong solutions flowing through pipes P3' and P10 from the high-temperature generator 1 and the middle-temperature generator 2 respectively, and sent to the absorber 6 through the pipe P3 via the low-temperature heat exchanger 8 by the strong solution pump 81. Refrigerant vapor generated in the low-temperature generator 3 is sent to the condenser 4, cooled by cooling water flowing in a condensing heat-transfer tube 43 to be condensed there, and sent to the evaporator 5 through a pipe P9 along with the refrigerant drain which has exchanged heat with the dilute solution in the low-temperature drain heat exchanger 85.

On the other hand, the dilute solution sent to the middle-temperature heat exchanger 9 exchanges heat with the strong solutions from the high-temperature generator 1 and the middle-temperature generator 2 to further increase its temperature. The dilute solution sent to the middle-temperature drain heat exchanger 95 exchanges heat with the refrigerant drain condensed in the middle-temperature generator 2 to increase its temperature. Then, these dilute solutions are rejoined once, then separated again as one portion is sent to a middle-temperature generator 2 through a pipe P11 and the remaining is sent to the high-temperature heat exchanger 10 and the steam drain heat recovery unit 105. The valve (solenoid valve or motor valve) 26 is provided to the bypass pipe P13 for sending the dilute solution to the steam drain heat recovery unit 105.

The refrigerant drain whose temperature is reduced by exchanging heat with the dilute solution in the middle-temperature drain heat exchanger 95 is joined together with the refrigerant drain condensed in the low-temperature generator 3 and sent to the low-temperature drain heat exchanger 85.

Refrigerant vapor generated in the high-temperature generator 1 is sent to the inside of tubes of a heat-transfer tube bundle 53 via a pipe P5. The dilute solution sent to the middle-temperature generator 2 through the pipe P11 is heated and concentrated by the condensation heat of the refrigerant vapor, becomes a strong solution, and overflows into a float box 24. A float valve 25 is installed in the float box 24. This float valve 25 is a flow-rate adjusting means for adjusting the amount of dilute solution sent to the middle-temperature generator 2 based on a liquid level of the strong solution in the float box 24. The strong solution in the float box 24 flows through the pipe P10, is joined together with the strong solution heated and concentrated in the high-temperature generator 1 passing through the pipe P3', and is introduced to a flow passage of the high-temperature side of the middle-temperature heat exchanger 9.

The refrigerant used for heating in the middle-temperature generator 2 and condensed in tubes of a heat transfer tube bundle 53 is sent to the middle-temperature drain heat exchanger 95 through a pipe P5', and after heating the dilute solution with sensible heat, it is joined together with the refrigerant drain condensed in the low-temperature generator 3 to be sent to the condenser 4 via the low-temperature drain heat exchanger 85. The refrigerant vapor generated in the middle-temperature generator 2 is sent to the low-temperature generator 3 to heat and concentrate the dilute solution flowed into the low-temperature generator 3.

On the other hand, the dilute solution sent to the high-temperature heat exchanger 10 exchanges heat with the strong solution from the high-temperature generator 1 to further increase its temperature. The dilute solution sent to the steam drain heat recovery unit 105 exchanges heat with a steam drain after being used for heating in the high-temperature generator 1, and increases its temperature. Then, these dilute solutions are rejoined and flow into the high-temperature generator 1 via a float valve 25a provided in a float box 24a. This float valve 25a is a flow-rate adjusting means for adjusting the amount of the dilute solution to be sent to the high-temperature generator 1 based on a liquid level of the strong solution in the float box 24a.

In the present embodiment, the high-temperature generator 1 heats and concentrates a solution using steam supplied through the pipe P12 as a heat source. The steam supplied to the high-temperature generator 1 through the pipe P12 is supplied from the sunlight heat utilization system including the boiler shown in FIG. 1. The valve (solenoid valve or motor valve) 27 is provided to the bypass pipe P14 which is branched off from the pipe P12 to bypass the steam drain heat recovery unit 105, and the valve (solenoid valve or motor valve) 28 is provided to the pipe P12 in the inlet side of the heat recovery unit 105 after the bypass pipe P14 is branched off. These valves 26 to 28 are, as described in FIG. 4, controlled according to the day time or the night time operation modes.

The dilute solution flowed into the high-temperature generator 1, after being heated and concentrated by exchanging heat with the steam from the heat source, becomes a strong solution, and is sent to the float box 24a, then to the high-temperature heat exchanger 10. In the high-temperature heat exchanger 10, the strong solution exchanges heat with the dilute solution to be passed into the high-temperature generator 1 to reduce its temperature, then it is joined together with the strong solution heated and concentrated in the middle-temperature generator 2, and sent to the middle-temperature heat exchanger 9. The refrigerant vapor generated in the high-temperature generator 1 is sent to the middle-temperature generator 2 through the pipe P5, and after being condensed in tubes of a heat transfer tube bundle by heating and concentrating the dilute solution in the middle-temperature generator 2, it is introduced to the middle-temperature drain heat exchange 95 through the pipe P5'.

As described above, the sunlight heat utilized steam absorption chiller according to the present embodiment uses sunlight heat to obtain high-temperature steam at 200° C. or above, which can be combined with a triple-effect steam fired absorption chiller to obtain a highly efficient sunlight heat utilization system. Unlike the conventional technology, it requires no flashing generator and either sunlight heat or the burning heat source can be used to concentrate the dilute solution diluted in the absorber. In addition, heat is recovered by the steam drain heat recovery unit from the steam drain after exchanging heat in the high-temperature generator, so that the efficiency can be significantly improved particularly when the absorption chiller is operated by generating steam with the burning heat source.

Furthermore, since the valves 26 to 28 are provided, the heat recovery in the steam drain heat recovery unit 105 can be stopped when the absorption chiller is operated using the steam generated by sunlight heat, but heat can be recovered from the high-temperature strong solution in the high-temperature heat exchanger 10, so the efficiency of the absorption chiller can still be improved when sunlight heat is being used.

In addition, the valves 26 to 28 may be made as an opening rate-adjustable motor valve, and the temperature of the steam drain in the downstream side of the steam drain heat recovery unit can be detected to control the valves; in this way, the system can be controlled to improve the total efficiency combining the boiler (burning heat source) operation efficiency and the absorption chiller operation efficiency.

In the above embodiment, three valves, 26 to 28, are provided to control the heat recovery in the steam drain heat recovery unit 105; however, the valve 27 is not necessarily needed. The valve 28 is provided so that when the dilute solution is not to be passed to the steam drain heat recovery unit 105, the high-temperature steam drain also can be stopped from being passed into the heat recovery unit 105. This has an effect of preventing the crystallization of a solution remained in the heat recovery unit 105.

Figure 6:
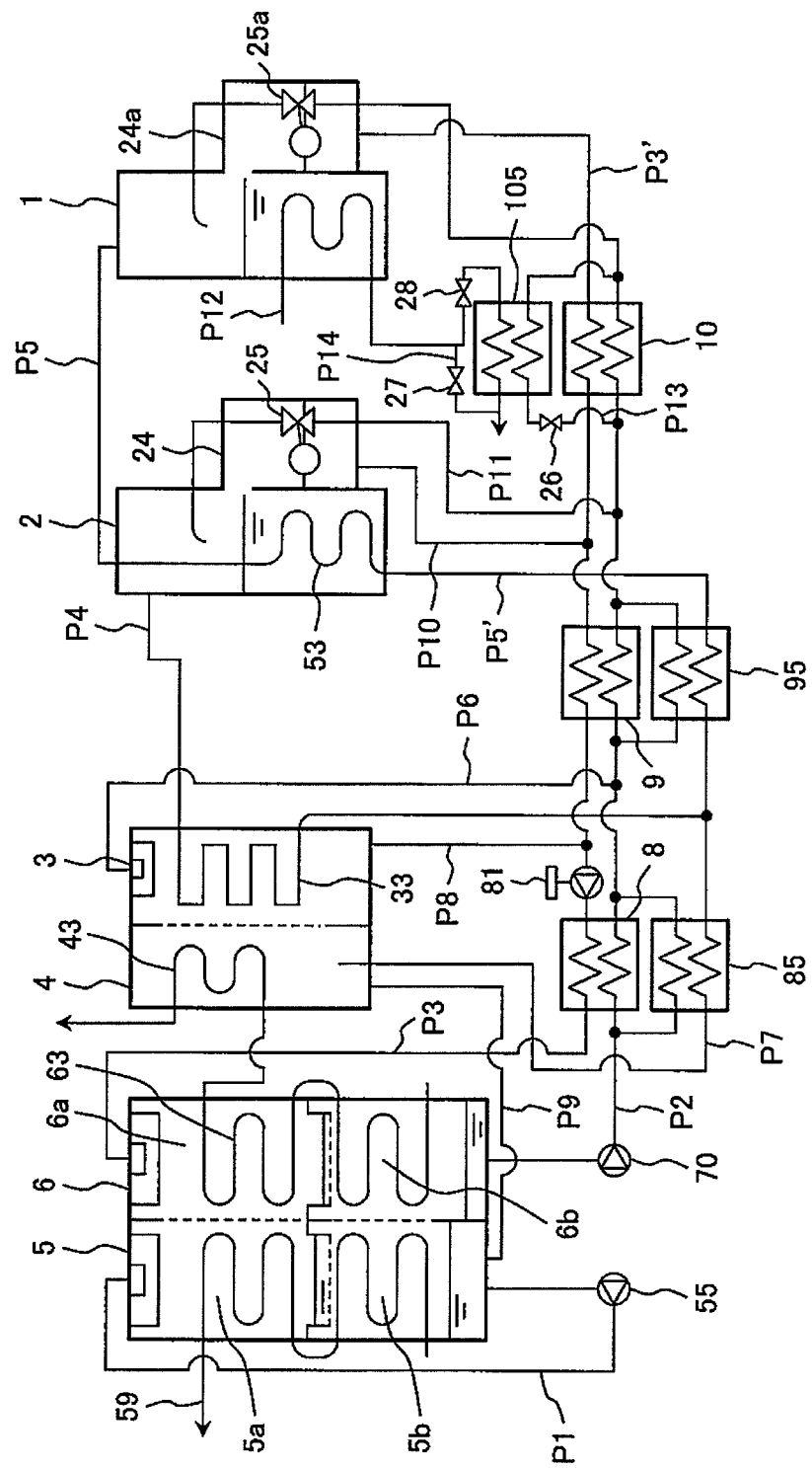
FIG. 6 is a system diagram showing an illustrative embodiment of the sunlight heat utilized steam absorption chiller.

In the embodiment shown in FIG. 6, part of the dilute solution outputted from the middle-temperature heat exchanger 9 is separated to the middle-temperature generator 2 while the remaining dilute solution is passed into the high-temperature heat exchanger 10, and the strong solution outputted from the high-temperature heat exchanger 10 is joined together with the strong solution outputted from the middle-temperature generator 2 to be passed into the middle-temperature heat exchanger 9. By contrast, in the system shown in FIG. 3, the dilute solution outputted from the low-temperature heat exchanger 8 is separated to flow into each of the low-temperature generator 3, the middle-temperature heat exchanger 9, and the high-temperature heat exchanger 10. The strong solution outputted from the high-temperature heat exchanger 10, the strong solution outputted from the middle-temperature heat exchanger 9, and the strong solution outputted from the low-temperature generator 3 are joined together to be passed into the low-temperature heat exchanger 8. Even when the pipes are configured in this way as shown in FIG. 3, the same effects as those shown in FIG. 6 can be obtained.

Example 2

While Embodiment 1 describes a case when the present invention is applied to a triple-effect sunlight heat utilized steam absorption chiller, the present invention is not limited to triple-effect systems, but can be applied to double-effect or single-effect absorption chillers in the same manner.

Figure 7:
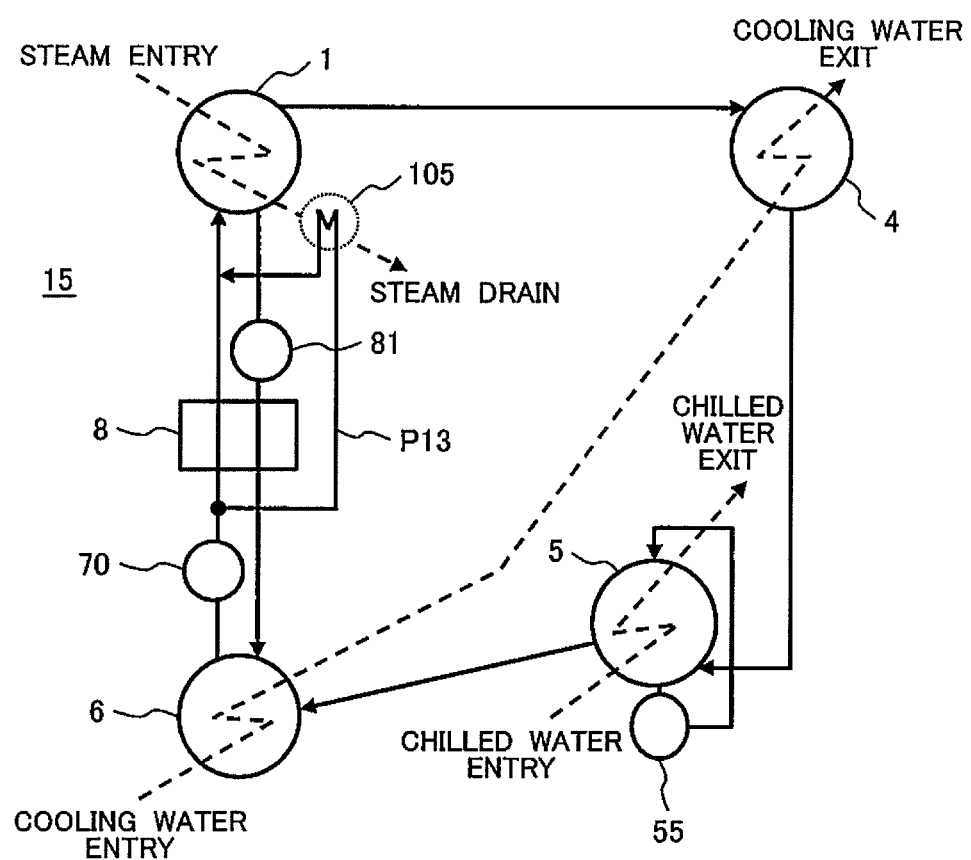
FIG. 7 is a system diagram showing Embodiment 2 of the sunlight heat utilization absorption chiller according to the present invention.

An embodiment of when it is applied to a single-effect sunlight heat utilized steam absorption chiller will be described with reference to FIG. 7. In FIG. 7, a component having the same reference numeral as that in FIG. 3 is the same or a corresponding component; thus redundant descriptions will be omitted.

In FIG. 7, a difference from FIG. 3 is that there is only one generator; no middle-temperature generator 2 or low-temperature generator 3 in the triple-effect system shown in FIG. 3 is used. Furthermore, none of the high-temperature heat exchanger 10, the middle-temperature heat exchanger 9, the middle-temperature drain heat exchanger 95, and the low-temperature drain heat exchanger 85 is provided.

The generator 1, in the same manner as in Embodiment 1, is inputted with steam from the sunlight heat utilization system including the boiler. In this case, steam at 0.1 MPa and 120° C., e.g., is used.

A dilute solution from the absorber 6 is supplied to the generator 1 by the dilute solution pump (the solution circulation pump) 70. A solution (a strong solution) concentrated by the steam in the generator 1 is returned to the absorber 6 by the strong solution pump (the solution dispersing pump) 81 to be dispersed.

Refrigerant vapor separated from the dilute solution in the generator 1 is sent to the condenser 4 to be condensed by cooling water. 8 is a low-temperature heat exchanger for allowing heat exchange between the dilute solution outputted from the absorber 6 and the strong solution to be supplied to the absorber 6. Liquid refrigerant condensed in the condenser 4 is sent to the evaporator 5, is dispersed by the refrigerant pump 55, and evaporates by taking heat away from chilled water flowing in the evaporator 5, then flows into the absorber 6 to be absorbed in a solution. Chilled water flowing in the evaporator 5 flows into the evaporator 5 at 15° C., e.g., cooled to 7° C., and then, supplied to the air-conditioner 18 (see FIG. 1) and the like.

The absorber 6 is supplied with cooling water of 34° C., in this example, from a cooling tower or the like to cool the absorber 6, then the cooling water flows into the condenser 4 to cool the refrigerant vapor while the cooling water itself is heated to about 39° C., and is returned to the cooling tower.

As described above, the generator 1 is inputted with steam at 0.1 MPa and 120° C., and after the solution inside the generator 1 is concentrated by this heat, the steam flows out of the generator 1 as a steam drain. The steam drain, however, has a high temperature around 100° C., thus, the steam drain heat recovery unit 105 is provided also in Embodiment 2 in the same manner as in Embodiment 1; the dilute solution is introduced by the bypass pipe P13 from the upstream side of the heat exchanger 8, and after the dilute solution is heated in the steam drain heat recovery unit 105 for heat recovery, it is introduced to the generator 1. As a result, the temperature of the steam drain flowing out of the steam drain heat recovery unit 105 can be reduced to 90° C. or below by the heat recovery.

The configuration around the steam drain heat recovery unit 105 can be made in the same way as those in FIGS. 4 and 5 described in Embodiment 1, and it can be controlled in the same way to obtain the same effects.

Figure 8:
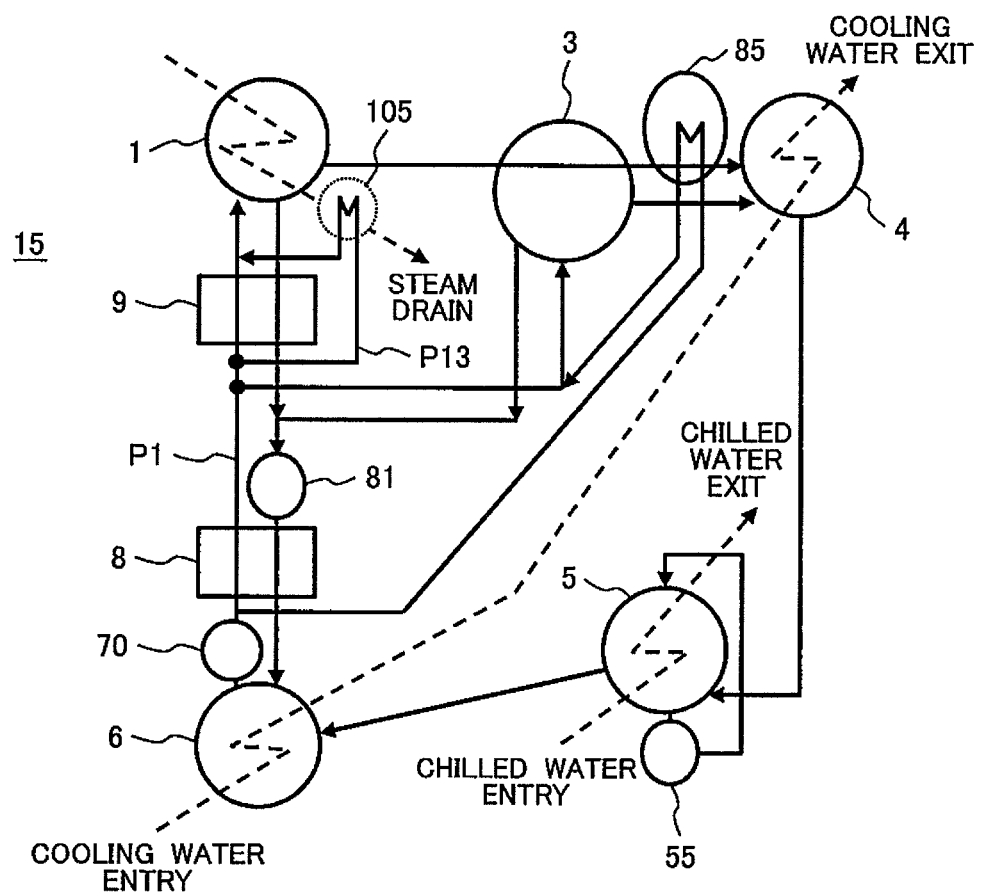
FIG. 8 is a system diagram showing Embodiment 2 of the sunlight heat utilization absorption chiller according to the present invention, but showing a different example from FIG. 7.

In this way, the present invention can be applied to a single-effect absorption chiller in the same manner, and furthermore, it can be applied to a double-effect absorption chiller shown in FIG. 8 in the same manner. Although the efficiency of the absorption chiller will be lower in comparison to the case of the triple-effect system, much the same effects can be obtained.

In FIG. 8, a component having the same reference numeral as those in FIGS. 7 and 3 described above is the same or a corresponding component; since its configuration is also similar, the detailed description will be omitted.

In each embodiment described above, the absorption chiller having a cycle structure of a parallel flow type is used as an example, however, the present invention is not limited to the parallel flow type, but can be applied to a multi-effect cycle (such as a triple-effect cycle or a double-effect cycle) absorption chiller adopting a series flow type or a reverse flow type in the same manner. The absorption chiller in the present invention is not limited to a chiller for producing chilled water, but it can be applied to an absorption chiller-heater for producing not only chilled water but also hot water in the same manner; thus, the absorption chiller includes an absorption chiller-heater.

The invention claimed is:

1. A sunlight heat utilized steam absorption chiller comprising: a generator using steam generated by sunlight heat as a heat source, an absorber, an evaporator, a condenser, a heat exchanger for allowing heat exchange between a dilute solution flowing from the absorber to the generator and a strong solution flowing from the generator to the absorber, and a means for generating steam by a burning heat source, wherein either the steam generated by the burning heat source or the steam generated by sunlight heat can be used as a heat source for the generator, wherein a steam drain heat recovery unit for allowing at least part of the dilute solution flowing from the absorber to the generator to exchange heat with a steam drain discharged from the generator is provided to allow heat recovery from the steam drain.

2. The sunlight heat utilized steam absorption chiller according to claim 1, wherein a bypass pipe is provided for separating at least part of the dilute solution from the upstream side of the heat exchanger for exchanging heat between the dilute solution and the strong solution, and returning the dilute solution to the downstream side of the heat exchanger after heat is recovered via the steam drain heat recovery unit.

3. The sunlight heat utilized steam absorption chiller according to claim 2, wherein a valve is provided to the bypass pipe for separating at least part of the dilute solution from the upstream side of the heat exchanger to introduce the solution to the steam drain heat recovery unit, a bypass pipe for bypassing the steam drain heat recovery unit is further provided to the pipe for passing the steam drain, and another valve is provided to the pipe for passing the steam drain between a branching portion of the bypass pipe for bypassing the steam drain heat recovery unit and an inlet of the steam drain heat recovery unit.

4. The sunlight heat utilized steam absorption chiller according to claim 3, wherein the valve provided to the bypass pipe and the valve provided to the pipe for passing the steam drain are controlled so that they are closed when the steam generated by sunlight heat is inputted to the generator but opened when the steam generated by the burning heat source is inputted to the generator.

5. The sunlight heat utilized steam absorption chiller according to claim 4, wherein the valve provided to the bypass pipe and the valve provided to the pipe for passing the steam drain are flow-rate adjustable motor valves, a temperature detector for detecting a temperature of the steam drain is provided to the pipe for passing the steam drain in the downstream side of the steam drain heat recovery unit, and a controller for controlling the motor valves is provided so that the temperature detected by the temperature detector stays within a predetermined temperature range.

6. The sunlight heat utilized steam absorption chiller according to claim 5, wherein the controller controls the motor valves so that the temperature stays within the predetermined range which improves the total efficiency combining efficiency of a means for generating steam and absorption chiller efficiency.

7. The sunlight heat utilized steam absorption chiller according to claim 1, wherein a pipe for passing the dilute solution in the downstream side of the heat exchanger for allowing heat exchange between the dilute solution and the strong solution is introduced to the generator after passing through the steam drain heat recovery unit.

8. A sunlight heat utilized steam absorption chiller comprising: a generator using steam generated by sunlight heat as a heat source, an absorber, an evaporator, a condenser, a heat exchanger for allowing heat exchange between a dilute solution flowing from the absorber to the generator and a strong solution flowing from the generator to the absorber, and a means for generating steam by a burning heat source, wherein either the steam generated by the burning heat source or the steam generated by sunlight heat can be used as a heat source for the generator, wherein the absorption chiller is a triple-effect absorption chiller provided with a high-temperature generator, a middle-temperature generator, and a low-temperature generator.

9. The sunlight heat utilized steam absorption chiller according to claim 2, wherein the absorption chiller is a triple-effect absorption chiller, the generator comprises a high-temperature generator, a middle-temperature generator, and a low-temperature generator, the heat exchanger comprises a high-temperature heat exchanger for allowing heat exchange between the dilute solution flowing from the absorber to the high-temperature generator and the strong solution flowing from the high-temperature generator to the absorber, and the bypass pipe comprises a bypass pipe for separating at least part of the dilute solution from the upstream side of the high-temperature heat exchanger and returning the dilute solution to the downstream side of the high-temperature heat exchanger after passing through the steam drain heat recovery unit for heat recovery.

10. A sunlight heat utilization system comprising: a steam generator provided with a solar thermal collector for generating a high-temperature heating medium using sunlight heat and a steam generating means for generating steam from the high-temperature heating medium generated by the solar thermal collector, wherein the high-temperature steam generated by the steam generator is introduced to a sunlight heat utilized steam absorption chiller comprising: a generator using steam generated by sunlight heat as a heat source, an absorber, an evaporator, a condenser, a heat exchanger for allowing heat exchange between a dilute solution flowing from the absorber to the generator of the absorption chiller and a strong solution flowing from the generator of the absorption chiller to the absorber, and a means for generating steam by a burning heat source, wherein either the steam generated by the burning heat source or the steam generated by sunlight heat can be used as a heat source for the generator of the absorption chiller.

11. The sunlight heat utilization system according to claim 10, wherein the solar thermal collector has a solar thermal collecting portion, a sunlight heat receiving portion for receiving sunlight collected by the solar thermal collecting portion to heat a heating medium flowing inside, and a heat insulating portion for insulating heat around the sunlight heat receiving portion while passing sunlight.

* * * * *